Patented Oct. 26, 1926.

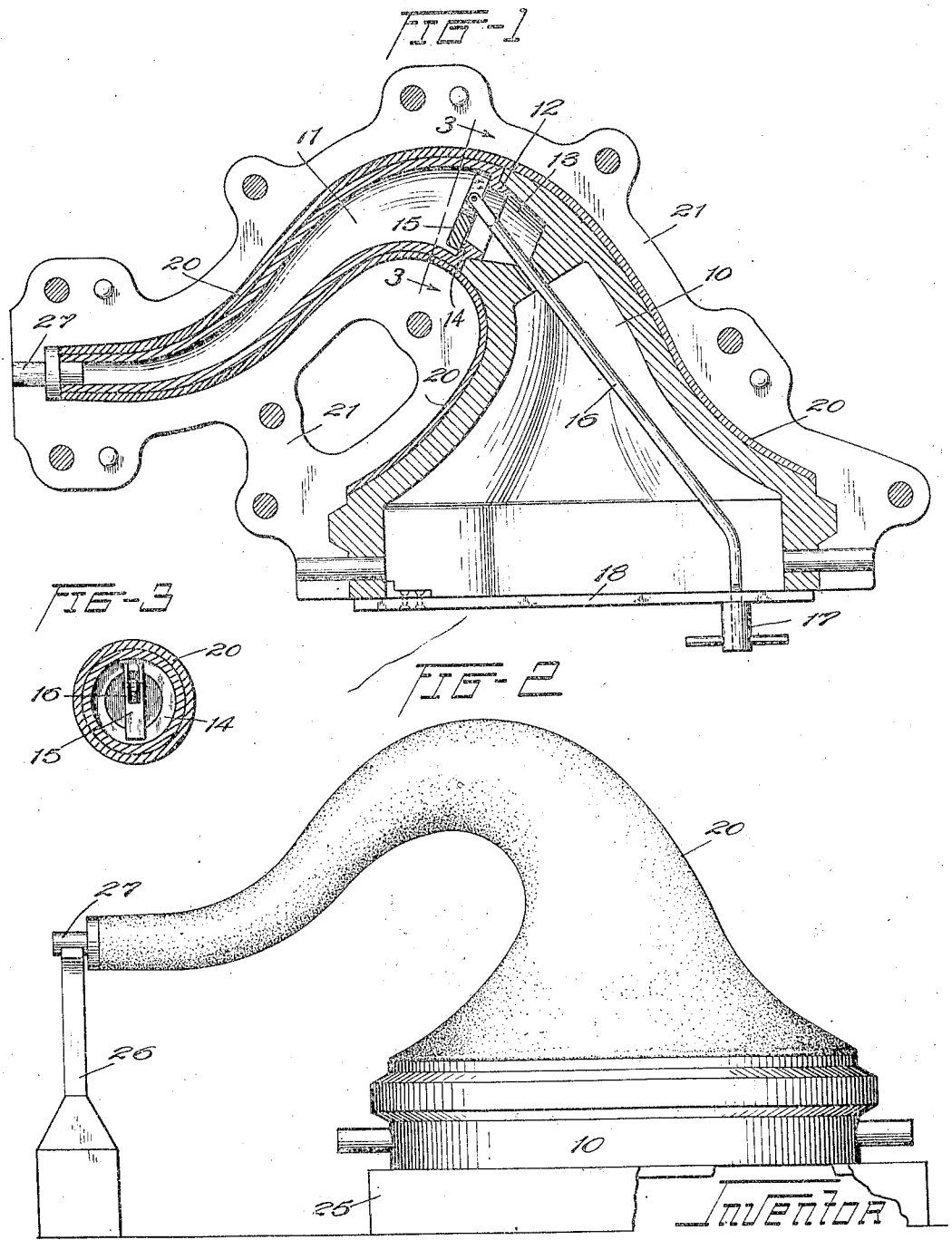

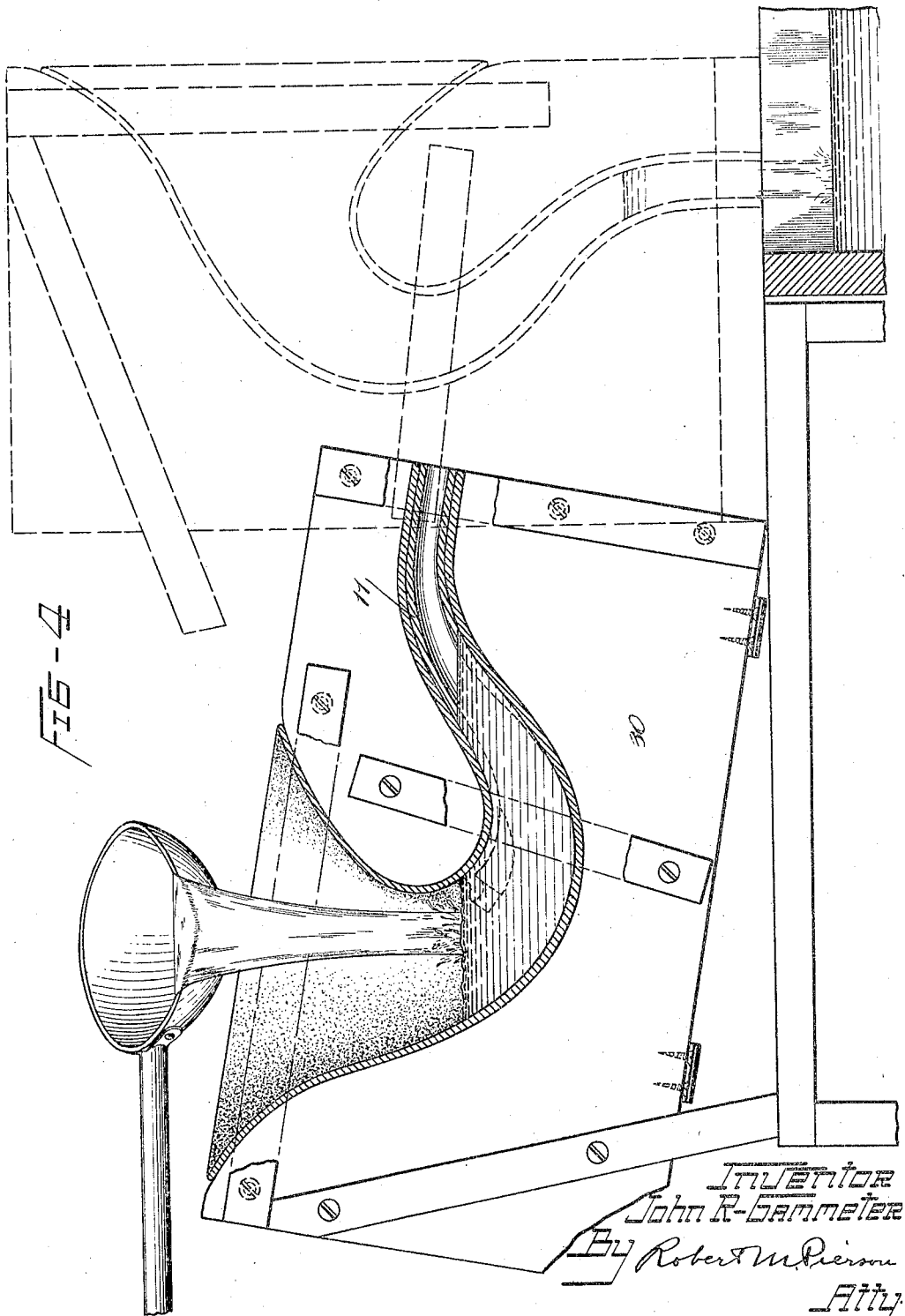

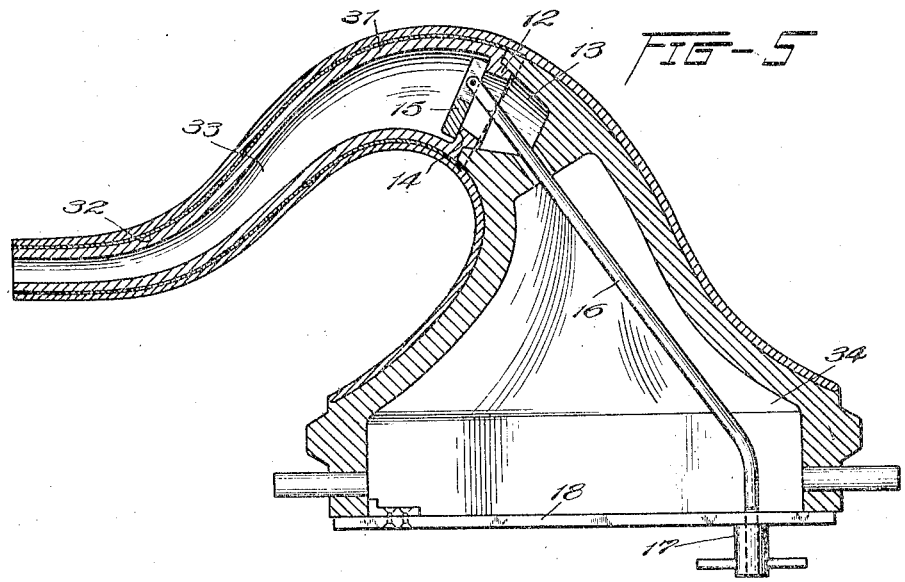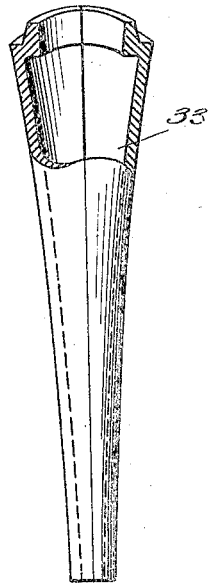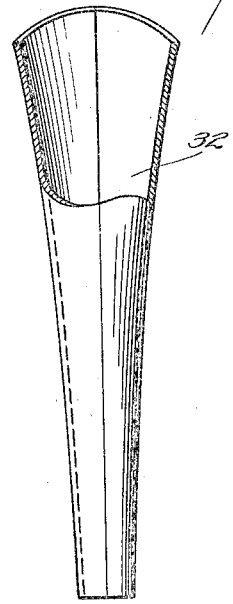

1,604,274

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING HOLLOW RUBBER ARTICLES.

Application filed September 20, 1924. Serial No. 738,814.

This invention relates to the manufacture of hollow rubber articles and more particularly to a means of producing sound projectors such as are commonly used in radio reception.

An object of this invention is to provide an improved method of producing sound projectors from hard rubber and for removing the cores employed in the molding and curing operations. A further object is to provide an improved core construction for forming sound projectors, and also to provide an improved means for removing such core construction from the sound projector after vulcanization.

In the manufacture of hard rubber sound projectors, and similar hollow articles having relatively thin walls, I have found it to be desirable, if not essential to satisfactory products, when the articles are to be cured in open heat, to apply heavy pressure to the walls of the uncured article during a preliminary molding or forming step, which necessitates a sturdy core for supporting the walls of the article during the performance of said step. The removal of cores of this character from sound projectors of the usual conformation presents some difficulties by reason of the sinuous conformation of the neck portion. I have devised a core consisting of two detachable sections or mandrels, a bell-shaped mandrel for the flaring end of the projector of cast iron or other durable material and a hollow or tubular neck-forming mandrel of low fusing metal. The removal of this core-construction from the projector, after vulcanization, is thereby greatly facilitated. The bell shaped mandrel is easily slipped from the horn and the fusible mandrel, forming a relatively small portion of the entire core structure, is melted out, preferably by flushing into the projector hot metal of the same alloy as the fusible mandrel, or other liquid, such as oil, which is not miscible with the mandrel metal.

In the accompanying drawing, Fig. 1 is a view in vertical section showing an early stage in the formation of a sound projector, the core, the unvulcanized stock thereon, and the mold being represented in position for the molding operation; Fig. 2 is a view in elevation illustrating the molded projector upon the core and supported for curing in dry heat; Fig. 3 is a cross-section on the line 3—3 of Fig. 1; Fig. 4 is a view partially in section and partially in elevation illustrating a method of melting out the soft metal mandrel; Fig. 5 is a view in vertical section of a modified form of the core construction illustrated in Fig. 1; Fig. 6 is a detailed front elevation, partly in section, of the fusible metal sectional core employed in my improved core construction, and Fig. 7 is a similar view of the sheet metal liner of Fig. 5.

Referring more particularly to the drawing, I show in Fig. 1 a core for a sound projector consisting of a bell-shaped mandrel 10 of cast iron or other material, and a hollow neck-forming mandrel 11 of fusible metal. This metal may be an alloy of lead and tin melting at about 350° C., but any other suitable alloy of low melting temperature may be used. The mandrel 11 is tubular in form and open at both ends. It is provided at its inner end with a tapered flange 12 adapted to fit within a complemental recess 13 of the bell-shaped mandrel 10. The flanged end of the fusible mandrel is interiorly formed with a shoulder 14 to provide an anchorage for a suitable means for securing the two mandrels together. As shown, a bar 15 is pivotally secured to one end of a rod 16, the other end of the rod, which is threaded and provided with a thumb nut 17, passes through a bar 18, the latter being secured to the outer end of the bell-shaped mandrel 10. The arrangement is such that the two mandrels may be securely drawn together by anchoring the bar 15 against the shoulder 14 of the fusible mandrel and turning the thumb nut 17 into engagement with the bar 18. The unvulcanized rubber stock is designated by the numeral 20 and is shown in Fig. 1 placed about the mandrels 10 and 11 and encased by the mold sections 21, one section only being shown in this figure.

In Fig. 2 the projector having been molded into the desired form is shown in position on the mandrel for heat curing. The bell shaped mandrel 10 is placed upon a support 25, preferably constructed to permit a circulation of heating medium throughout the interior of the mandrel, and the outer end of mandrel 11 is supported upon a stand 26. As shown, a pin 27 fitting into the small end of the fusible mandrel 11 rests in a groove at the top of the stand 26.

After vulcanization, the bell shaped mandrel 10 is detached from the fusible mandrel 11, as by loosening the thumb nut 17 and disengaging the bar 15 from the shoulder 14, and is withdrawn from the projector. Only the relatively small fusible mandrel 11 remains still in the projector and this is removed quickly and readily without straining or damaging the projector by flushing a hot fluid therethrough. In order to facilitate the flow of the flushing metal through the bell, when metal is used, and to preclude its adhesion thereto, I preferably paint the interior of the bell with mica. In practice, the projector is placed in a cradle 30 which conforms in shape to the projector and enables it to be readily and freely handled during the melting out process without distortion of the projector or danger to the operator.

While it is to be understood that different ways of procedure may be followed in melting out the fusible mandrel, I have found a satisfactory method to consist in supporting the projector in the position shown in Fig. 4, pouring four or five ladles full of hot metal of the same alloy as the fusible mandrel into the larger end of the projector and then gradually tilting it to the position indicated in the dotted lines indicated in Fig. 4 in order to draw off both the flushing and the melted metal. In operating upon projectors of small sizes, I have also found it to be desirable initially to pour some hot metal through the projector from the small end in order to enlarge the passage at the small end of the neck and thus to facilitate drainage upon flushing out the fusible mandrel in the manner above described. Other hot fluids may also be used in the melting out operation, as for example high boiling oils or super-heated steam, a general desideratum being that these other hot fluids shall not be miscible with the fused metal of the mandrel which for economical reasons should be saved for reuse.

In the modification shown in Fig. 5, the neck forming mandrel 31 is provided with a thin sheet metal shell 32 which surrounds the fusible portion 33 of the mandrel 31. The mandrels 31 and 34 are detachably secured together and the rubber stock fitted thereabout, molded and vulcanized in the manner indicated hereinabove. In this case, however, upon melting out the fusible core the sheet metal shell is left within the projector to form a lining for the neck portion. This construction gives greater strength to the neck of the projector and forms a smooth inner surface which minimizes distortions of sound waves passing therethrough. In the manufacture of sound projectors of the smaller sizes, the fusible portion 33 of the mandrel 31 may be omitted. In this case the shell 32 fits over the end of the mandrel 34, as shown in Fig. 5, is held in place during molding and vulcanization by its frictional engagement therewith, and forms a lining for the neck portion of the completed sound projector as just described.

As is shown in Fig. 6 the fusible core is preferably cast in two sections, the sections then being soldered or fused together by means of a welding flame applied exteriorly to the seam. This forms a fusible core which is extremely cheap to manufacture, particularly since the metal is used over and over again. The sheet metal shell 32, (Fig. 7) is likewise preferably made in two sections, for example by a stamping process, and the two halves are secured to each other by crimping, soldering or other convenient means.

It is to be understood that the present invention contemplates broadly, the employment of a core composed of a readily fusible metal for the formation of the neck portion of the sound projector and the melting out of the core after the vulcanization thereof. It further contemplates the employment of a fusible neck-forming core either with or without the sheet metal shell or liner for reinforcing the neck of the projector. Furthermore, it is the intention of the present invention to cover all such modifications of the above described means as properly fall within the scope of the appended claims, and all analogous uses of the invention in making hollow articles other than sound projectors.

I claim:

1. The method of manufacturing hollow vulcanized articles which comprises forming vulcanizable rubber stock about a hollow fusible core open at both ends and which remains solid at the temperatures of vulcanization, vulcanizing the formed rubber stock on the core, and melting out the fusible core after vulcanization by passing through the core in direct contact with the fusible metal thereof a fluid of higher temperature than the melting point of the fusible metal of the core.

2. The method of manufacturing hollow vulcanized articles which comprises forming vulcanizable rubber stock about a hollow fusible core, vulcanizing the formed rubber stock on the core at temperatures at which the core remains solid, and melting out the fusible core after vulcanization by passing therethrough in direct contact with the fusible metal of the core a fluid of higher temperature than the melting point of the core.

3. The method of manufacturing sound projectors of hard rubber which comprises forming a core by detachably securing to a bell-shaped mandrel a hollow neck-forming mandrel of low-fusing metal, covering the core with a vulcanizable rubber stock, pressing the stock between said core and an exterior mold to form the sound projector, vulcanizing the formed rubber stock on the core, removing the bell-shape mandrel, and melting out the hollow neck-forming mandrel.

4. The method of manufacturing sound projectors of hard rubber which comprises forming a core by detachably securing to a bell-shaped mandrel a hollow neck-forming mandrel of low-fusing metal, covering the core with a vulcanizable rubber stock, pressing the stock between said core and an exterior mold to form the sound projector, vulcanizing the formed rubber stock on the core, removing the bell-shape mandrel, and melting out the hollow neck-forming mandrel by pouring therethrough a fluid of higher temperature than the melting point of the fusible metal.

5. The method of manufacturing sound projectors of hard rubber which comprises forming a core by detachably securing to a bell-shaped mandrel a hollow neck-forming mandrel of a metal fusing at a temperature somewhat above the temperature of vulcanization employed, covering the core with a vulcanizable rubber stock, pressing the stock between said core and an exterior mold to form the sound projector, removing the exterior mold, vulcanizing the formed rubber stock on the core, removing the bell-shape mandrel, and melting out the hollow neck-forming mandrel by pouring through the hollow core heated molten metal of the composition of the metal core.

6. The method of manufacturing sound projectors of hard rubber which comprises forming a core by detachably securing to a bell-shaped mandrel a hollow neck-forming mandrel of low-fusing metal having an exterior sheet metal shell, covering the core with a vulcanizable rubber stock, pressing the stock between said core and an exterior mold to form the sound projector, removing the exterior mold, vulcanizing the formed rubber stock on the core, removing the bell-shape mandrel and melting out the fusible metal of the neck-forming mandrel so as to leave the sheet metal shell as a permanent lining for the neck of the sound projector.

7. The method of removing a hollow core of low fusing metal from an article which comprises pouring through the hollow core in direct contact with the fusible metal of the core a fluid of higher temperature than the melting point of the fusible core.

8. The method of removing a hollow core of low fusing metal from a hard rubber article which comprises pouring through the core in direct contact with the fusible metal of the core hot molten metal of the composition of the metal of the hollow core.

9. The method of removing from a vulcanized hard rubber article a hollow core of low fusing metal which comprises supporting the article against deformation, and pouring through the hollow core in direct contact with the fusible metal of the core a fluid of higher temperature than the melting point of the fusible core.

10. A core for the formation of hard rubber sound projectors comprising a bell-shaped mandrel forming such portion of the entire core as can be readily removed intact from the vulcanized projector through the large open end thereof, and a fusible neck-forming mandrel detachably secured thereto.

11. A core for the formation of hard rubber sound projectors comprising a bell-shaped mandrel and a hollow neck-forming mandrel of low-fusing metal detachably secured thereto.

12. A core for the formation of hard rubber sound projectors comprising a bell-shaped mandrel forming such portion of the entire core as may be readily removed from the vulcanized projector through the large open end thereof, and a hollow, neck-forming mandrel of low-fusing metal, and means for detachably connecting said mandrels.

13. A core for the formation of hard rubber sound projectors including a mandrel of fusible metal forming such portion of the entire core as cannot be readily removed from the large open end of the projector.

In witness whereof I have hereunto set my hand this 18th day of September, 1924.

JOHN R. GAMMETER.